United States Patent [19]

Klaja

[11] 3,861,066
[45] Jan. 21, 1975

[54] PAPER HOLDER STENCIL BOARD

[76] Inventor: Irene D. Klaja, 1550 Wilder Ave. Apt. A 1112, Honolulu, Hawaii 96822

[22] Filed: May 11, 1973

[21] Appl. No.: 359,487

[52] U.S. Cl. ................................................. 35/37
[51] Int. Cl. .......................................... G09b 11/02
[58] Field of Search....................... 35/26, 37, 62.69; 33/174 B; 101/48, 50, 114, 126; 117/38; 282/29 R

[56] References Cited
UNITED STATES PATENTS

| 639,623 | 12/1899 | Smith | 101/126 |
|---|---|---|---|
| 1,006,393 | 10/1911 | Montgomery | 33/174 B |
| 2,543,714 | 2/1951 | Bednarczuk | 33/174 B |
| 2,950,537 | 8/1960 | Fixen | 33/174 B |
| 3,699,660 | 10/1972 | Siegel | 33/174 B |

*Primary Examiner*—Robert W. Michell
*Assistant Examiner*—A. J. Heinz
*Attorney, Agent, or Firm*—James C. Wray

[57] ABSTRACT

Children's paper holding stencil board apparatus has a generally rectangular rigid base and spacer blocks mounted along front and rear elongated edges of the base and along one lateral edge of the base. A rigid stencil board has cut-out portions which represent artistic and symbolic figures and is mounted on the spacer blocks spaced upward from the base for receiving paper supported on the base and held against movement by the spacer blocks while the cut-out portions are traced by a pencil onto the paper. The spacer blocks and edge portions of the stencil board are complementarily configured to rigidly support the stencil board above the base in a removable and replaceable manner. Elongated grooves are formed on inward faces of the spacer blocks so that varied stencil board may be slid into position above the base. The blocks support the stencil board a sufficient distance above the base so that packs or pads of paper can be inserted between the stencil board and the base. A shelf area of the base extends outward between longitudinal ends of the front and rear spacer blocks and a second lateral edge of the base to aid in guiding paper into position on the base between the spacer blocks and below the stencil board.

4 Claims, 3 Drawing Figures

PATENTED JAN 21 1975 3,861,066

PAPER HOLDER STENCIL BOARD

BACKGROUND OF THE INVENTION

In the general education and learning encouragement of young children, it is important that the children be aware of and related coordinated sensory perceptions of the eyes and hands and movement of the hands. It is important that children be motivated by successes and rewards in the form of recognizable and comparable accomplishments. While the direct health and relationship of another person, such as a parent or sibling or surrogate parent or sibling such as a teacher is desirable, it is not always possible to provide ready, immediate and direct supervision on a continuous basis. Moreover, it may be that feelings of accomplishment and success are engendered by solitary activities.

Many toys and devices are commercially available or manufacturable which aid in a child's self development and coordination. In developing such devices, great care must be taken to make these devices of such a nature that frustrations and negative successes and achievements which are equateable with failure are avoided.

Tracing devices are available on the market and have been described in patents. However, such known tracing devices do not accomplish the objects of the present invention of providing self development, self motivation and success in achievement of rewards while avoiding frustration and negative results.

Representative publications of known tracing devices are found in United States patents, particularly those classified in Class 35 and subclasses 26, 27 and 28 of the official United States patent classification. Representative examples are Oppenheim U.S. Pat. No. 3,535,791, issued Oct. 27, 1970; Maurer U.S. Pat. No. 3,633,286, issued Jan. 11, 1970; Mabbutt U.S. Pat. No. 3,696,529, issued Oct. 10, 1972; Ribken U.S. Pat. No. 3,419,971, issued Jan. 7, 1969; and Forbell U.S. Pat. No. 2,258,603, issued Oct. 14, 1941.

SUMMARY OF THE INVENTION

Broad objectives of the invention are accomplished by providing a paper holding stencil board which is readily used without frustration or negative value feedbacks to the child.

The stencil board apparatus of the present invention has a base which is generally rectangular. The base is rigid and is constructed out of a strong, substantial material, such as plywood, to stand repeated use and misuse without destruction. Spacer blocks, having substantially square cross section, are mounted on the face of the base along three edges. The spacer blocks are of uniform thickness, and together surround a partially peripherally enclosed area on the upper face of the base. A stencil board is mounted on the spacer blocks and is held in fixed position spaced upward from the base by the spacer blocks. The stencil board has a plurality of openings which are representative of objects and symbols easily recognizable by children. The spacer blocks hold the stencil board a sufficient distance above the base so that conventional children's pads, tablets or paper packs may be held between the stencil board and the base in an assembled plurality of similar size sheets. The spacer blocks hold the paper from twisting or otherwise moving during use of the stencil board apparatus.

In a preferred embodiment, the base has a shelf area which projects outward from beneath the stencil board and which is formed by terminating the spacer blocks and stencil board short of the second lateral edge of the base. The shelf area aids in the moving of paper into the partially peripherally enclosed area on the base beneath the stencil board. The shelf area enables a child with little mechanical skill and coordination to direct a paper into the tracing area.

The stencil board apparatus of the present invention may be used with single sheets of paper or with multiple sheets. In the multiple sheet use, a helper may insert several sheets into the stencil board, and a child may withdraw the sheets one at a time after they have been used. Alternatively, several sheets may be packaged in the stencil board, and all of the sheets may be removed before use. A child is given one or more sheets and is shown how to insert the sheets in the apparatus, using the shelf as a guide, and is shown how to trace through the cut-out portions of the stencil board. Experience indicates that after tracing one or more designs on a paper, the child will remove the paper and will observe and appreciate the work which he has produced.

In one form of the invention, elongated services of the stencil block are complementarily configured to receive edges of stencil boards and to hold the stencil board by their edges for use during children's stenciling operations. The complementary configurations permit removal of the stencil boards from the apparatus and replacement of different stencil boards having varied cut-out portions.

In a preferred form, inwardly directed faces of the spacer blocks are grooved to receive and hold stencil boards by sliding edges of the stencil boards into the grooves.

One object of the invention is the provision of a simplified stencil board apparatus for use by children with a rigid base, spacer blocks which permit paper ingress and egress and a stencil board rigidly held above the spacer blocks with cut-out openings for tracing designs on paper placed on the base beneath the stencil board and between the blocks.

Another object of the invention is the provision of a stencil board apparatus having a rigid stencil rigidly spaced above a rigid base with access beneath one edge of the stencil for sliding multiple sheets of paper between the stencil and the base and with spacer blocks holding the stencil board above the base and acting as holding devices for preventing twisting or other movement of the paper while the stencil apparatus is in use.

Another object of the invention is the provision of a stencil board apparatus having a rigid base, having spacer blocks extending along three edges of the base and partially peripherally enclosing an area of the base on the base and having inward facing slots in the spacer blocks for slidably receiving rigid stencil boards and holding the rigid stencil boards above the base while the stencil apparatus is being used.

These and other objects and features of the invention are apparent in the disclosure, which includes the drawings and the foregoing and ongoing specification, with the appended claims.

DETAILED DESCRIPTION OF THE DRAWINGS

Figure 1:
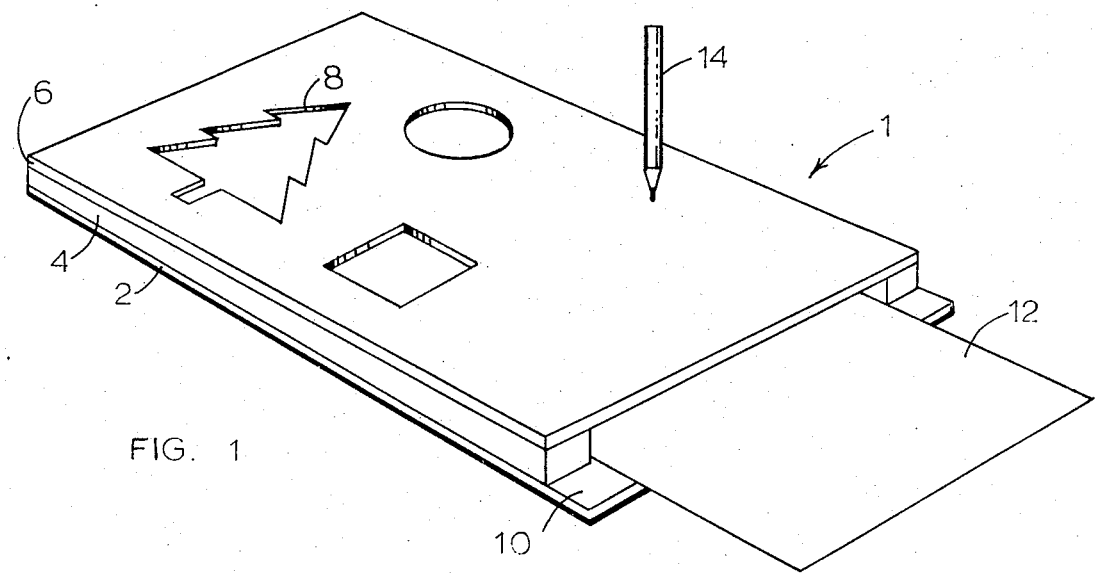
FIG. 1 is a perspective view of the stencil board apparatus with a sheet of paper partially inserted into the paper receiving area.

Referring to FIG. 1, stencil board apparatus is generally indicated by the numeral 1. Base 2 has a generally rectangular shape. Front and rear edges are parallel and are connected by first and second lateral edges of the base. Spacer blocks 4, which have generally rectangular cross sections, are positioned along three edges of the base. Front and rear spacer blocks are joined along one lateral edge by a first lateral edge spacer block. A stencil board 6 is mounted on the spacer blocks spaced upward above the area of base 2 which is partially enclosed by the spacer blocks 4. Cut-out openings 8 are representative of commonly occurring objects and symbols which are recognizable by young children. As shown at the right of the drawing, a sheld area 10 is formed near the second lateral edge of base 2. Shelf area 10, which extends outward beyond the lateral ends of the front and rear spacer blocks 4 and stencil board 6, guides the paper beneath the stencil board. Shelf 10 aids in guiding paper 12 into the space surrounded by the base, stencil board and spacer blocks. Pencil 14 is used by a child to follow cut-out outlines 8 and to form images thereby on paper 12.

Figure 2:
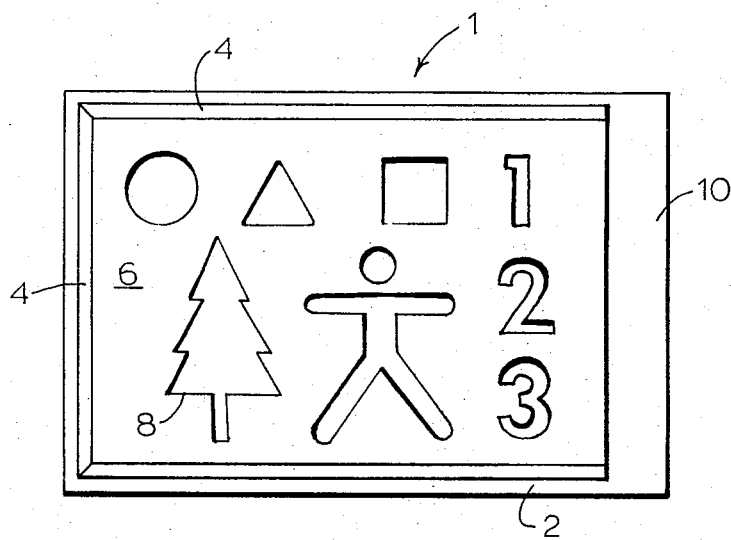
FIG. 2 is a top plan view of one modified form of the stencil board apparatus of the present invention.
Figure 3:
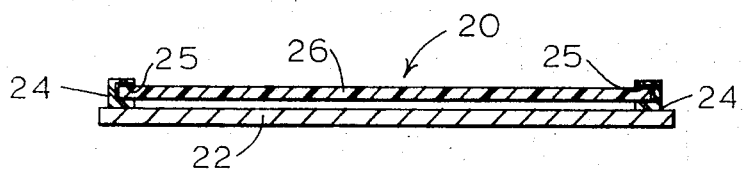
FIG. 3 is a cross sectional view taken from one lateral edge of a modified form of the stencil board of the present invention.

Like numerals are used to represent like elements in FIG. 2. Stencil board apparatus 1 has a base 2, which is generally rectangular in shape. In the embodiment of FIG. 2, spacer blocks 4 are mounted slightly inward from front and rear and first side edges of base 2. Rectangular recesses are formed along inward upper edges of the spacer blocks 4 so that stencil board 6 fits within the recesses, as shown in FIG. 3, while being maintained above base 2. Cut-out elements 8 are slightly different on the stencil board 6, which is shown in FIG. 2. The shelf area 10 is provided on the stencil board apparatus of FIG. 2 to aid in the insertion of paper in the space defined by base 2, stencil board 6 and spacers 4.

A modification of the invention is shown in FIG. 3 and is generally indicated by the numeral 20. For clarity, the view is shown as a cross sectional view looking from a direction of a first lateral edge of the base toward the second lateral edge and the shelf area. In FIG. 3, a rectangular base 22 is provided, and spacer blocks 24 are fixed around three edges of the base. Blocks 24 have inward facing grooves 25 which extend over the entire length of the spacer blocks 24. The grooves 25 receive edges of stencil board 26, holding the stencil board firmly in place spaced above base 22. When it is desired to change the depictions of objects and symbols on the stencil board, stencil board 26 is slid out of the grooves and is replaced with another stencil board, such as board 6 shown in FIG. 2.

While the invention has been described in part with reference to specific embodiments, it will be obvious to those skilled in the art that modifications and variations of the invention may be constructed without departing from the spirit and scope of the invention. The scope of the invention is defined in the following claims.

What is claimed is:

1. Children's stencil apparatus comprising a base having a generally elongated rectangular shape, having relatively long front and rear edges and relatively short first and second lateral edges joining the front and rear edges, a front spacer block having a generally rectangular cross section and being elongated in a direction parallel to elongated edges of the base and being mounted on the base adjacent the front longitudinal edge, a rear spacer block having a generally rectangular cross section and being elongated in a direction parallel to the rear edge of the base mounted on the base along the rear edge, a first side spacer block having a generally rectangular cross section and being elongated in a direction perpendicular to the cross section, and being shorter than the front and rear spacer blocks, the first side spacer block being mounted on the base along the first lateral edge of the base, thereby forming with the front spacer block and the rear spacer block a partially peripherally enclosed area on the base, and a rectangular elongated stencil board comprising a rigid board having rigid interior cut-out portions which are representative of artistic and symbolic articles, the stencil board having a size and shape similar to the base, and the stencil board being mounted on the spacer blocks and being supported above the base over the partially peripherally enclosed area for receiving paper on the area below the stencil board, held by the spacer blocks and inserted through an opening between the stencil board and the base near the second lateral edge of the base, whereby a pencil may be inserted through the cut-out portions of the stencil board for tracing shape of the cut-out portions on a paper, wherein the front and rear spacer blocks extend from the first lateral edge of the base respectively along the front and rear edges of the base and terminate at positions spaced inward from the second lateral edge of the base, and wherein the stencil board is spaced inward from the second lateral edge, whereby a shelf portion of the base is formed between ends of the spacer blocks and the second lateral edge of the base for receiving paper to be slid onto the partially peripherally enclosed area of the base and for guiding paper into that area, wherein the spacer blocks have substantial and commensurate vertical dimensions, whereby the stencil board is substantially spaced from the base and is parallel to the base for receiving multiple sheets of paper between the stencil board and the base on the partially peripherally enclosed area.

2. The apparatus of claim 1 wherein the spacer blocks define complementary laterally inward facing elongated horizontal grooves in the spacer blocks, spaced upward from the base, and wherein corresponding edges of the stencil board fit within the spaced grooves whereby the rigid stencil board is supported in the grooves above the base.

3. The apparatus of claim 2 wherein the edges of the stencil board have thinknesses less than vertical dimensions of the grooves, whereby the stencil board fits within the grooves with clearance, whereby the stencil board may be freely slid out of the grooves for replacing with another similarly configured stencil board with unique cut-out portions.

4. The apparatus of claim 1 wherein the stencil board and spacer blocks are complementarily configured with slideable interengaging edges and grooves, whereby the stencil board may be removed from the spacer blocks and may be replaced with another stencil board having unique cut-out portions.

* * * * *